3,576,889
ETHYNYLATION OF KETONES AND ALDEHYDES
TO OBTAIN ALCOHOLS
Kenneth R. Martin and Constantinos G. Screttas,
Gastonia, N.C., assignors to Lithium Corporation of
America, New York, N.Y.
No Drawing. Filed Jan. 26, 1968, Ser. No. 700,692
Int. Cl. C07c 33/04; C23b 5/08
U.S. Cl. 260—638                                    15 Claims

ABSTRACT OF THE DISCLOSURE

Ethynylation of ketones and aldehydes by adding acetylene to a suspension of an alkali metal amide in a liquid ether, particularly in the presence of a stabilizing agent, such as dimethylacetamide or dimethylsulfoxide, which serves to activate the formation of a monoalkali metal acetylide and to stabilize said monoalkali metal acetylide and thereafter hydrolyzing to obtain an alcohol.

---

This invention relates to a novel method of ethynylation of carbonyl compounds selected from the group of ketones and aldehydes, and it involves the use of alkali metal amides, especially lithium amide ($LiNH_2$) as a metalating agent in the formation, intermediatewise, of a monoalkali metal acetylide, particularly monolithium, acetylide, in certain liquid media other than liquid ammonia.

It has heretofore been known to utilize alkali metal amides in liquid ammonia as the reaction medium as, for instance, lithium metal has been added to liquid ammonia containing a catalyst such as $Fe(NO_3)_3$ or $FeCl_3$ whereby a suspension of lithium amide is formed, whereupon acetylene is then passed through said suspension to form a soluble monolithium acetylide ($LiC\equiv CH$), which reacts with a ketone or aldehyde to ethynylate the same (A. L. Henne and K. W. Greenlee, J. Am. Chem. Soc., 65, 2020 (1943); 67, 484 (1945). Such procedure is a variation of the general method of carrying out monolithium acetylide ethynylations in liquid ammonia. The foregoing known methods of producing ethynylated ketones and aldehydes have a number of objections which are effectively overcome by the practice of our present invention, as will be pointed out in more detail below.

We have discovered that certain reaction media, disclosed hereafter in detail, are distinctly more desirable than liquid ammonia for use in ethynylation reactions utilizing lithium amide; that certain stabilzng agents are effectve to activate the formation of monoalkali metal acetylides and to stabilize them so that they can be used effectively as ethynylating agents; and that certain of said stabilizing agents can be used in very small amounts, of the order of catalytic quantities, for instance, 0.1 or 0.2 equivalent or less, per equivalent of alkali metal amide, and yet are effective to bring about high yields and, in certain cases, substantially quantitative yields of ethynylated ketones and aldehydes. More specifically, we have found that, in the presence of certain stabilizing agents, $LiNH_2$, in certain liquid ether media, reacts with acetylene to form a stabilized monolithium acetylide ($LiC\equiv CH$) which is capable of very effectively ethynylating ketones and aldehydes, in certain cases producing yields of the corresponding ethynols (upon hydrolysis) of the order of 95 to 100%. The stabilizing agents which are especially satisfactory are those which are characterized by a neutral to acid reaction (in aqueous medium) or, in other words, are non-basic in reaction.

We have, furthermore, produced certain novel catalyst systems which are specially useful in ethynylation reactions such as are described hereafter pursuant to the teachings of our present invention.

While the method of our invention is applicable to ethynaylations broadly of ketones and aldehydes utilizing alkali metal amides and acetylene, in the manner hereafter disclosed, it will, for convenience, first be more particularly described in its especially preferred embodiments.

A slurry or suspension is made of $LiNH_2$ in (a) a liquid ether, such as tetrahydrofuran (THF) or dimethoxyethane, (b) a stabilizer in the form of a liquid sulfoxide such as dimethylsulfoxide (DMSO) or tetramethylenesulfoxide, or a liquid amide such as dimethylacetamide (DMA), or mixtures of sulfoxides and amides. Then, acetylene is passed through said suspension in a volume in the range of about 100 to 1000% of the equivalent amount of acetylene in relation to the lithium amide in said slurry or suspension. During the reaction which occurs, ammonia is released and most of it is lost as a gas since ammonia is only slightly soluble in the reaction medium employed. Then the ketone or aldehyde is added dropwise as a neat liquid or, if a solid, as a solution preferably in a liquid ether, or, in certain cases, in a liquid hydrocarbon such as benzene or toluene which is miscible with the liquid ether solvent, with desired temperature control, and the reaction is carried out for a time necessary for the desired completion of the ethynylation reaction. By way of illustration, where the ketone is cyclohexanone, a temperature of about 25 degrees C. for a period of about 2 hours is generally satisfactory; where the ketone is methylvinyl ketone, a temperature of about 25 degrees C. for a period of about 5 minutes is generally satisfactory; and, where the aldehyde is acrolein, a temperature in the range of —50 to +30 degrees C. for a period of about 2 to 3 hours in the lower temperature range and 5 minutes in the upper temperature range is generally satisfactory. Yields under optimum conditions are commonly in the range of about 90 to about 100%.

The method of our invention has a number of advantages over the aforementioned known liquid ammonia-lithium amide procedure in that:

(1) The reaction generally may be carried out much more rapidly, it is generally much cleaner, and little cooling is required;

(2) The yields of the product ethynols are generally greatly increased, commonly being close to quantitative;

(3) Recovery of the solvent and the stabilizing agent is simple; and (4) Ethynylation of $\alpha,\beta$-unsaturated aldehydes such as acrolein can be carried out by our method, which is substantially impossible in liquid ammonia.

The overall reaction scheme of our invention may be indicated as set out below, utilizing acetylene and a ketone:

(I)    $MeNH_2 + HC\equiv CH + {_n}Z \longrightarrow MeC\equiv CH.Z_n + NH_3$ where Me is an alkali metal, especially lithium, Z is stabilizing agent which, at least in certain instances, appears to form a complex with the monoalkali metal acetylide, and $n$ represents the number of equivalents of Z used in the reaction and may, generally speaking, vary from about 0.01 to about 1 equivalent per equivalent of alkali metal amide used.

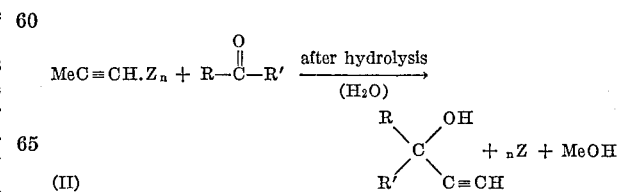

where R and R' are the radicals which, together with the carbonyl group, represent a ketone.

In the case of the use of dimethyl sulfoxide as the stabilizing agent, the overall ethynylation reaction, using methylvinyl ketone as the carbonyl compound, is generally represented by the following equation:

$$2LiNH_2 + 2HC\equiv CH + CH_3SOCH_3 \longrightarrow$$

$$(LiC\equiv CH)_2 \cdot CH_3SOCH_3 + NH_3 \uparrow$$

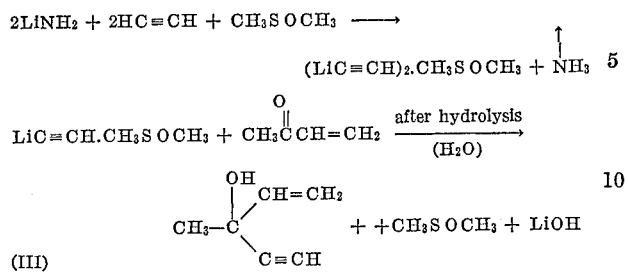

Among the various liquid ethers which can be used as the media in which the reaction is carried out are, by way of example, linear alkyl ethers such as the dialkyl ether such as dimethyl ether, diethylether, di-n-propyl ether, diisopropyl ether, di-n-butyl ether and diisobutyl ether; dialkyl ethers of aliphatic polyhydric alcohols such as the dialkyl ethers of alkylene glycols such as dimethyl ether of ethylene glycol, diethyl ether of ethylene glycol, diisopropyl ether of ethylene glycol, diisopropyl ether of diethylene glycol; dimethyl-, diethyl- and diisopropyl ethers of propylene glycol; cyclic alkyl ethers such as tetrahydrofuran (THF), tetrahydropyran (THP), dioxane, and 7-oxa[2,2,1] - bicycloheptane (OBH); and liquid ethers which can be represented by the formula

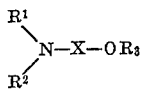

where $R^1$, $R^2$ and $R^3$ are the same or different alkyl groups each containing from 1 to 4 carbon atoms, namely, methyl, ethyl, n-propyl, isopropyl, n-butyl, isobutyl, and tertiarybutyl; and $x$ is a nonreactive group such as

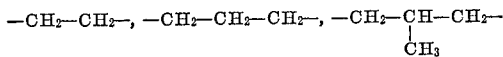

or other divalent hydrocarbon radicals, illustrative examples of such ethers being, for instance, 2-dimethylaminoethylmethyl ether [$(CH_3)_2N—CH_2—CH_2—O—CH_3$]; 2-diethylaminoethylmethyl ether

[$(C_2H_5)_2N—CH_2—CH_2—O—CH_3$]

and 2-dimethylaminopropylmethyl ether

[$(CH_3)_2N—CH_2CH_2CH_2—O—CH_3$]

Especially satisfactory are THF and other ethers having solvating properties similar thereto as, for instance, dimethoxyethane.

The stabilizing agents, as indicated above, include normally liquid sulfoxides having the formula

in which R is alkyl (including cycloalkyl) containing from 1 to 12 carbon atoms, $R^1$ is alkyl containing from 1 to 12 carbon atoms or aryl or aralkyl hydrocarbons containing from 6 to 9 carbon atoms, or R and $R^1$ together form an alkylene group as in tetramethylene sulfoxide. Thus, R and $R^1$ can be methyl, ethyl, propyl, isopropyl, butyl, isobutyl, amyl, isoamyl, hexyl, cyclohexyl; or aryl or aralkyl hydrocarbon such as phenyl as in diphenylsulfoxide, or benzyl as in dibenzylsulfoxide; or R can be alkyl and $R^1$ can be aryl as in methylphenylsulfoxide, or benzyl as in methylbenzylsulfoxide; or R can be lower alkyl ($C_1$ to $C_4$) and $R^1$ can be higher alkyl ($C_8$ to $C_{12}$) as in methyldodecylsulfoxide, isopropyldecylsulfoxide, and the like. Especially satisfactory among the sulfoxides is dimethylsulfoxide (DMSO).

The amide stabilizing agents can, in the main, be represented by the formula

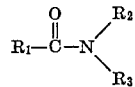

in which $R_1$ is hydrogen or alkyl (including cycloalkyl), and $R_2$ and $R_3$ are each alkyl (including cycloalkyl), aryl or aralkyl, the alkyl advantageously containing from 1 to 6 carbon atoms, and the aryl and aralkyl containing from 6 to 9 carbon atoms such as phenyl, methylphenyl, isopropylphenyl and benzyl. The amides are generally desirably normally liquids at room temperature, illustrative examples of which are dimethylformamide (DMF), dimethylacetamide (DMA), diethylacetamide, diisopropylacetamide, diphenylacetamide and dibenzylacetamide. DMA is especially satisfactory among the amide stabilizing agents and it usually an be employed in low quantities, of the general order of 0.1 to 0.2 equivalent per equivalent of $LiNH_2$.

We have also found that hexa-alkylphosphoramides such as hexamethylphosphoramide [$(CH_3)_2N]_3P=O$ and hexaethylphosphoramide [$(C_2H_5)N]_3P=O$ and we have also found that such compounds as 2-aminoethanol; 2-pyrrolidone; and 1-methyl-2-pyrrolidone are useful stabilizing agents for the purposes of our present invention.

It will be understood, of course, that not all of the stabilizing agents which are disclosed herein will give the same or substantially equivalent results with all ketones or all aldehydes so far as percent yield or conversion to the respective ethynols are concerned. It will also be understood that, in general, concentrations of reactants plays a role in the yields obtained, and the same is true with respect to reaction times. For optimum yields in any given case, these factors can readily be determined in the light of the teachings contained herein. Thus, by way of illustration, in the case of methylvinyl ketone ethynylations, DMSO, DMA, and hexamethyl phosphoramide have been found to be particularly satisfactory. DMA and N-methylpyrrolidone (NMP) generally have the advantage of being useful in distinctly less than stoichiometric amounts, for instance, even as low as about 0.1 or 0.2 equivalent per equivalent of $LiNH_2$. Indeed, in the case of DMA, using $LiNH_2$, and THF as the ether medium, and ethynylating methylvinyl ketone, the optimum concentration for the DMA is generally about 0.11 to 0.2 equivalent with a reaction time of somewhat less than 3 minutes at 25–30 degrees C. for the production of methylvinylethynyl carbinol. However, higher amounts of DMA, ranging up to about 1 equivalent thereof per equivalent of $LiNH_2$, also give excellent yields. Thus, in illustrative runs in which methylvinyl ketone, in a 0.5 M solution of monolithium acetylide in THF, was ethynylated in a reaction medium to which $LiNH_2$ and DMA were added and acetylene gas bubbled therethrough, the yields of methylvinylethynyl carbinol, after hydrolysis of the ethynylated product, were as follows using varying equivalents of DMA:

| Run No.: | Equivalents of DMA | Percent yield |
|---|---|---|
| A | 1 | 100 |
| B | 0.5 | 83 |
| C | 0.2 | 96 |
| D | 0.11 | 100 |

In Run No. B, the decreased yield was caused by allowing the hydrolysis mixture to become basic for a short period of time.

The concentration of the monolithium acetylide, which forms in the course of the reaction, is variable and is conveniently in the range of 0.25 to 1 M with 0.5 M generally being approximately optimum.

The foregoing situation would appear to indicate that DMA does not form a complex with the ethynolate or forms only a weak complex and is, therefore, still available to complex the monolithium acetylide. In regard to the mechanism of the reaction or reactions which occur when acetylene is bubbled through a LiNH$_2$–DMA mixture in THF, which said mechanism has not been fully established, it is believed that a complex of monolithium acetylide is formed with the DMA only to the extent that the monolithium acetylide can be stabilized by the DMA, and then further formation of monolithium acetylide waits until DMA is released in the ethynylation reaction.

Still further, by way of illustration, in ethynylating methylvinyl ketone, utilizing LiNH$_2$, DMSO and acetylene, in the practice of the present invention, a concentration of at least 0.5 and up to 1 equivalent of DMSO gives excellent yields of methylvinylethyl carbinol, 0.5 equivalant of DMSO per equivalent of LiNH$_2$ producing a yield of 100% and 1 equivalent of DMSO producing a yield of 92% in certain reactions so carried out. On the other hand, using 0.2 equivalent of DMSO gave a yield of only about 25% of the methylvinylethynyl carbinol. It may be noted, in the case of DMSO, that LiNH$_2$ itself reacts therewith only very slowly at 25 degrees C.

The desired reactions, in accordance with the present invention, will not take place unless the activator, for example DMSO or DMA, which, also, commonly functions as a complexing agent, is present in the environment in which the method of the present invention is carried out.

While the invention is most advantageously carried out using lithium amide, particularly because the ammonia which formed is highly volatile and can readily be removed so as not to interfere with the treatment particularly of sensitive ketones where basicity is very detrimental, other lithium amides can be used although, as indicated, generally with distinctly lesser advantage. Such other lithium amides include, for instance, lithium diethylamide, lithium diisopropyl amide, lithium dibutyl amide and lithium diisobutyl amide. Further, as previously indicated, other alkali metal amides can be used such as sodium amide, potassium amide, rubidium amide and cesium amide as well as the other aforementioned diloweralkylamides but of the alkali metals other than lithium.

The method of the present invention is applicable to the ethynylation of ketones and aldehydes generally, of aliphatic (including cycloaliphatic) or aromatic character, saturated and unsaturated such as alkanones, alkenones, alkanals and alkenals. Illustrative of such ketones are acetone, methylethyl ketone, methyl n-propyl ketone, diethylketone, di-n-propyl ketone, diisopropyl ketone, di-n-butyl ketone, diisobutyl ketone, methyl-t-butyl ketone, di-n-amyl ketone, diisoamyl ketone, diacetyl, hexanone, cyclopentanone, cyclohexanone, isophorone, benzophenone, mesityl oxide, methylbenzyl ketone; 17-keto steroids, for instance, estrone which, on ethynylation, produces ethynylestradiol, and similar 17-keto steroids which, on ethynylation, produce 17 β-ethynyl steroids such as mestranol and analogous compounds; and ethyl β-chlorovinyl ketones which, on ethynylation, produces "Placidyl"; and illustrative of such aldehydes are formaldehyde, acetaldehyde, glyoxal, propionaldehyde, n-butyraldehyde, isobutyraldehyde, n-valeraldehyde, isovaleraldehyde, n-caproaldehyde, n-heptaldehyde, lauryldehyde, myristaldehyde, acrolein, crotonaldehyde, furfural, benzaldehyde, β-naphthaldehyde, glyceraldehyde, and aldehydes of other di- and polyhydric aliphatic alcohols. It may be noted that, depending upon the nature of the α,β-unsaturated ketones and aldehydes, the ethynylation reaction may produce 1,2- or 1,4-addition, that is, the production of vinyl ethynols or 2-ethynyl aldehydes or ketones or their ethynylation products.

In connection with the ethynylation of aldehydes, it may be noted that it has heretofore been known that saturated aldehydes can be ethynylated to produce ethynylation reaction products in quite high yields using monosodium acetylide in a suitable solvent. However, when α,β-unsaturated aldehydes are similarly ethynylated, poor yields are the general rule, just as is the situation with unsaturated ketones [Hennion and Lieb, J. Am. Chem. Soc. 66, 1289 (1944)]. As illustrative of the difficulties of ethynylating acrolein, reference is made to U.S. Pat. No. 2,879,308 where the method involves protecting the vinyl group of the acrolein against polymerization by reversibly forming a Diels-Alder adduct with a diene, such as cyclopentadiene, and then ethynylating said adduct with monosodium acetylide, the method taking 16 hours, involving heating the product to 370–400 degrees F. to reverse the adduct formation, and producing only a 31% yield of the alkynol.

In accordance with the present invention, by way of illustration, acrolein has been ethynylated directly in a LiNH$_2$-DMA-THF system in yields of the order of 85 to 98.5% (vinylethynyl carbinol). Generally optimum conditions in this system are the use of DMA in about 0.1 to 0.2 equivalent amount, reaction temperatures of 25 to 30 degrees C., and reaction times of 2 to 5 minutes. Good yields have also been obtained, for instance, in the ethynylation of crotonaldehyde, benzaldehyde, and trans-cinnamaldehyde, and other unsaturated aldehydes, as well as unsaturated ketones, by quite simple procedures and in short reaction times.

The following examples are illustrative of the practice of the invention, but they are not to be construed as in any way limitative thereof since various changes can readily be made in the light of the guiding principles and teachings disclosed herein. All temperatures recited are in degrees centigrade.

EXAMPLE 1

LiNH$_2$ (1.2 g., 0.05 mol) was suspended in 100 ml. of THF in a 250 ml. 3-necked, nitrogen-swept flask equipped with magnetic stirrer, nitrogen inlet, dropping funnel and an inlet tube for acetylene extending below the surface of the liquid. DMA (0.44 g., 0.005 mol) was introduced into the mixture. Acetylene was bubbled through the reaction mixture at a rate of 144 ml./min. After 15 minutes, dropwise addition of methylvinyl ketone (3.4 g., 0.045 mol) was begun. The addition rate was controlled so that the reaction temperature did not rise above 35 degrees, using external cooling if necessary. Acetylene passage was continued throughout the addition period, either at the same rate or at a reduced rate, say, half the initial rate. The reaction time with the methylvinyl ketone was equal to the addition time which, in turn, was set so that the reaction temperature did not exceed about 35 degrees. External cooling can be utilized so that the addition rate can be increased. Immediately after the ketone addition was completed, and, in any event, generally within a period of a few minutes after the completion of the ketone addition, the reaction mixture was hydrolyzed by pouring it over a mixture of ice and concentrated acetic acid, being careful that the pH of the hydrolysis mixture was below 7 at all times. Sodium chloride was added to salt out the alkynol, and the mixture was neutralized with NaHCO$_3$. The mixture was then extracted twice with diethyl ether, and the combined ether layers were dried and weighed. Titration of a 0.3 g. sample of the solution with excess 5% alcoholic AgNO$_3$ and back-titration with 0.1 N NaOH to the methylene blue endpoint gave a yield of 4.43 g. (98%) of methylvinylethynyl carbinol, B.P. 60 degrees (60 mm.).

EXAMPLE 2

LiNH$_2$ (1.2 g., 0.05 mol) was suspended in 100 ml. of THF in a 250 ml. 3-necked, nitrogen-swept flask equipped with magnetic stirrer, nitrogen inlet, dropping funnel and an inlet tube for acetylene extending below the surface of the liquid. DMSO (1.95 g., 0.025 mol) was introduced.

Acetylene was bubbled through the reaction mixture at the rate of 144 ml./min. After 20 minutes (a 100% excess of acetylene being added) dropwise addition of methylvinyl ketone (3.4 g., 0.045 mol) was begun. The addition rate was controlled so that the reaction temperature did not rise above 35 degrees, using external cooling if necessary. Acetylene passage was continued throughout the addition period as described in Example 1. Immediately after the ketone addition was completed, the reaction mixture was hydrolyzed by pouring it over a mixture of ice and concentrated acetic acid, being careful that the pH of the hydrolysis mixture was below 7 at all times. Sodium chloride was added to salt out the alkynol and the mixture was neutralized with $NaHCO_3$. The mixture was then extracted twice with diethyl ether, and the combined ether layers were dried and weighed. Titration of a 0.3 g. sample of the solution with excess 5% alcoholic $AgNO_3$ and back-titration with 0.1 N NaOH to the methylene blue endpoint gave a yield of 4.46 g. (99%) of methylvinylethynyl carbinol, B.P. 60 degrees (60 mm.).

EXAMPLE 3

Except as indicated below, the reactants in the proportions set out below were reacted in the manner described in Example 1:

500 ml. of THF
5.9 g. (0.25 mol) $LiNH_2$
4.3 g. (0.05 mol, 0.20 equiv.) DMA
17.2 g. (0.0247 mol) methylvinyl ketone External cooling was used to keep the reaction temperature in the 27 to 30 degrees range. The reaction mixture was stirred for 5 minutes after the ketone was added and then hydrolyzed. The workup procedure was modified in that all extractions and washings were made with measured amounts of THF rather than with ether. Hydroquinone was added to the hydrolysis mixture to prevent polymerization. The dried THF extract was stripped in a rotary evaporator at 100 mm. pressure and the THF collected in a trap. The recovery was 92.5%. Methylvinyl alkynol was isolated by distillation at 60 degrees (60 mm.) to give 18.4 g. (82% dist. yield); the yield by titration was 96%, giving an isolation of 86% of the alkynol based on that formed in the reaction. In addition, the distillation afforded a higher boiling fraction which was recovered DMA, 1.9 g. (43%). GLC analysis of the aqueous layer from the hydrolysis revealed that most of the remaining DMA was present there (1.4±0.2 g.). From the foregoing, it is clear that good recoveries of alkynol and solvent are obtained, and about half of the complexing agent can be recovered easily; the part in the aqueous layer is more difficult to recover.

EXAMPLE 4

1.2 g. (50 millimoles) of $LiNH_2$ and 0.87 g. (10 millimoles) of DMA or 0.96 g. 10 millimoles) of NMP were placed in 100 ml. of THF in a nitrogen-swept 250 ml. flask. Acetylene was bubbled through the mixture for 20 minutes at a rate of 200 ml./min. The rate of acetylene addition was then reduced to 140 ml./min. and 4.3 g. (50 millimoles) of cyclopentanone were added rapidly. The reaction temperature rose by about 8 to 10 degrees during the addition and the previously white reaction mixture turned bright yellow at the end of the addition. The reaction mixture was stirred, with continued acetylene passage, for the required reaction period. It was then hydrolyzed by pouring over a mixture of ice and acetic acid sufficient to give a neutral or slightly acidic solution at the end of the hydrolysis. Solid NaCl was added to the mixture, and it was neutralized (if necessary) with a saturated $NaHCO_3$ solution. The mixture was extracted twice with ether and the extracts were dried with $Na_2SO_4$ and weighed. An aliquot of about 0.3 g. was taken and titrated with alcoholic $AgNO_3$, then back-titrated with 0.1 N NaOH. The conditions, yields and results of a series of such examples with certain variations are summarized in the following Table I.

EXAMPLE 5

0.6 g. (25 millimoles) of $LiNH_2$ and 0.22 g. (2.5 millimoles) of DMA were placed in 100 ml. of THF in a 250-ml. nitrogen-swept flask. Acetylene was bubbled through the mixture for 20 minutes at a rate of 200 ml./min. The rate was then reduced to 140 ml./min. and 2 g. of cyclopentanone (22.5 millimoles) were added rapidly. The reaction temperature rose 5-7 degrees during the addition and maintained itself for 10 minutes after the addition was complete, the reaction mixture becoming bright yellow. The reaction mixture was stirred for 30 minutes after the addition of the ketone was complete and then hydrolyzed and worked up as previously described. The results are summarized in Table I.

TABLE I.—ETHYNYLATION OF CYCLOPENTANONE IN THF USING $LiNH_2$

| Run No.: | Stabilizing and complexing agent | Equivalent of stabilizing and complexing agent | Concentration of solution mols/liter | Time at 25°, hrs. | Percent yield |
|---|---|---|---|---|---|
| A | NMP | 0.2 | 0.5 | 1.5 | 72 |
| B | NMP | 0.2 | 0.5 | 0.5 | 70 |
| C | NMP | 0.2 | 0.5 | 0.5 | 70 |
| D | NMP | 0.2 | 0.5 | 1.5 | 64 |
| E | DMA | 0.1 | 0.5 | 2.0 | 65 |
| F | DMA | 0.1 | 0.5 | 0.5 | 85 |
| G | DMA | 0.2 | 0.5 | 0.5 | 84 |
| H | DMA | 0.1 | 0.5 | 1 | 77 |
| I | DMA | 0.1 | 0.5 | 1 5 | 77 |
| J[2] | DMA | 0.1 | 0.5 | 0.5 | 86 |
| K[2] | DMSO | 0.5 | 0.5 | 0.25 | 77 |
| L[2] | DMA | 0.1 | 0.5 | [3] 0.25 | 70 |
| M[2] | DMA | 0.1 | 0.25 | 0.5 | 93 |

[1] Minutes.
[2] 10% excess of $LiNH_2$.
[3] 35°.

EXAMPLE 6

(a) To 20 ml. of THF in a 100 ml. nitrogen-swept flask were added 0.5–0.6 g. (excess) of $LiNH_2$ and 0.1 g. (0.0011 mol) of DMA. Acetylene was bubbled through the mixture at a rate of 140 ml./min. After 15 minutes, 0.3 g. of estrone (0.0011 mol) dissolved in 40 ml. of THF were added rapidly and the reaction mixture was stirred for 4 to 5 hours at room temperature with continuous acetylene passage. At the end of the reaction period, the acetylene was turned off and the reaction mixture hydrolyzed over a mixture of ice and acetic acid. The mixture was neutralized and extracted several times with ether. The combined extracts were dried over anhydrous $Na_2SO_4$ and the solvent was removed under reduced pressure, leaving a pale yellow oil as residue. The oil was taken up in methanol and the product was precipitated by adding an equal volume of hot water. Filtration gave crude estradiol, which was dried in a vacuum desiccator overnight, giving white crystals of 17β-ethynylestradiol, M.P. 132–5 degrees. Recrystallization from 1:1 methanol-water gave a product with an M.P. of 143–4 degrees. Product yield was about 82%.

(b) In another run following the procedure of part (a) of this Example 6 except that 0.1 equivalent of DMA was used instead of the approximately 1 equivalent in part (a) and a 5 hour reaction period was used instead of 4.5 hours in part (a), product yield was about 90%.

EXAMPLE 7

A number of runs was made in which various unsaturated aldehydes were ethynylated utilizing the following general procedure. In Table II, the results of such runs are set forth.

To 100 ml. of THF in a nitrogen-swept 250 ml. flask were added 0.65 g. (25 millimoles) of $LiNH_2$ and 0.22 g. (2.5 millimoles) of DMA. A stream of acetylene was bubbled through the suspension at a rate of 200 ml./min. for 15 to 20 minutes, then at a rate of 140 ml./min. for the remainder of the reaction period. Neat aldehyde (22.5 millimoles) was then added dropwise over 2 to 3 minutes. The reaction temperature rose by 9 to 10 degrees. Within 3 minutes of the end of the aldehyde addition, the reaction mixture was hydrolyzed by pouring over a mixture of ice and an amount of acetic acid sufficient to just neutralize the base present (about 3.5 ml.). Solid NaCl was added to the mixture, and it was extracted twice with ether. The combined ether layers were dried over anhydrous $Na_2SO_4$ and weighed. Analysis was by titration of 0.3 to 0.5 g. sample with excess $AgNO_3$, followed by back-titration with 0.1N NaOH to the methylene blue endpoint. Except as noted below, samples for distillation were obtained by stripping most of the low-boiling material in a flash evaporator, followed by a short-path distillation of the residue into a liquid-nitrogen trap to remove polymeric material. The crude alkynol was then fractionated.

Runs Nos. A, B, C and D each involved the ethynylation of acrolein. Run No. E involved the ethynylation of benzaldehyde. Run No. F involved the ethynylation of crotonaldehyde. Runs G, H and I involved the ethynylation of trans-cinnamaldehyde.

TABLE II

| Run No.: | Conc., M | Temp., °C | Time (min.) | Percent yield (titration) |
|---|---|---|---|---|
| A | 0.25 | −55 | 40 | 89 |
| B | 0.25 | 27 | 5 | 98.5 |
| C | 0.50 | 27 | 5 | 87 |
| D | 0.40 | 27 | 5 | 85 |
| E | 0.50 | 35 | 60 | 78 |
| F | 0.25 | 27 | 5 | 87 |
| G[1] | 0.25 | 27 | 5 | [2]83 |
| H[1] | 0.25 | 27 | 15 | [2]94 |
| I' | 0.5 | 27 | 10 | [2]99 |

[1] Reaction mixture not distilled; distillation resulted in production of semi-crystalline polymeric material.
[2] $LiC\equiv CH$ 0.1 DMA.

In the runs of Example 7, it will be noted that high yields were obtained at approximately room temperature with short reaction times, and that high yields (Run No. A) were also obtained at very low temperatures but with longer reaction times. It may also be pointed out that, in Runs A, B, C and D, it was noted that the development of a bright yellow color in the reaction indicated the end of the reaction, and that no further temperature rise occurred hereafter. For example, if this point occurred when 75% of the aldehyde had been added, only a 75% yield of ethynol was obtained. On the other hand, quantitative yields were obtained when no coloration occurred before all of the aldehyde was added. The reaction appeared to go best to completion when the reaction temperature was allowed to rise above 27 degrees from the heat of reaction. If the rate of addition was slow, or if addition of the aldehyde was stopped for a short time, the reaction stopped. The rate of addition should be rapid enough so that the reaction is maintained; temperatures as high as 33–35 degrees during addition did not adversely affect the yield. The cause of the foregoing phenomenon is not definitely known, but is thought that it is due to formation of a complex between the lithium ethynolate and DMA, removing the activator from the reaction and thus stopping it. In the case of DMSO as the activator, it is thought that a strong complex is formed with the ethynolate, necessitating the use of an equivalent of activator; with DMA, there appears to be a competition between monolithium acetylide and the ethynolate, which favors the acetylide at higher temperatures, allowing the use of less than stoichiometric amounts of activator. These observations concerning the mechanisms which may be involved are not intended as being definitive of the reactions which may occur and are not to be construed as affecting in any manner the final results which are obtained by virtue of the procedures which have been described to achieve the advantages brought about by the present invention.

Particularly when working with relatively large quantities of reactants, especially in the ethynylation of acrolein or similar α,β-unsaturated aldehydes, to produce vinylethynyl carbinol, the reaction from the hydrolysis to the first distillation should be carried out in as short a time as possible to avoid polymer formation since the latter occurs fairly rapidly in the impure reaction mixture. The purified distillate, however, can be stored prior to fractionation. Furthermore, the hydrolysis mixture should not be allowed to become basic but it should be either acid or neutral. Finally, as indicated previously, the addition of the acrolein to the reaction mixture should be sufficiently rapid to keep the reaction from stopping. A reaction temperature of about 30 to 33 degrees appears to be generally optimum in the case of the ethynylation of acrolein. In ethynylating acrolein, as in the case of the ethynylation of methylvinyl ketone, there is a concentration effect, the yield decreasing with increasing concentrations above certain limits.

Other examples have been carried out in accordance with our invention in which the following carbonyl compounds have been ethynylated using $LiNH_2$ in a THF medium and wherein the stabilizing (complexing) agents were DMSO and DMA with the following results:

| Carbonyl compound: | Percent yield ethynol compound |
|---|---|
| Diisopropyl ketone (DMSO) | 94 |
| β-Ionone (DMSO) | 100 |
| Mesityl oxide (DMA) | 100 |
| Cyclohexanone (DMA) | 96 |
| 2-butanone (DMSO) | 100 |
| Benzophenone (DMA) | 91 |

Still other examples have been carried out in which the following carbonyl compounds have been ethynylated using $LiNH_2$ in a THF medium and wherein the stabilizing (complexing) agent was ethylenediamine (EDA) with the following results:

| Equiv. of EDA | Carbonyl compound | Percent yield alkynol compound |
|---|---|---|
| 1 | Methylvinyl ketone | 53 |
| 0.1 | Methylvinyl ketone | 65 |
| 0.1 | Diisopropyl ketone | 82 |

The lower yield of ethynol obtained from methylvinyl ketone using 1 equivalent of EDA than in the case where 0.1 equivalent was used is believed to be due to the basic character of EDA, it being noted that methylvinyl ketone and the ethynol are quite sensitive to base-catalyzed side reactions in the THF-EDA system. This conclusion appears to be supported by the fact that, in the case of the ethynylation of diisopropyl ketone, which is much less susceptible to base attack than is methylvinyl ketone, a yield of 82% of the alkynol was obtained. In any event, it is clear that DMA is distinctly superior to EDA with respect to activation of the ethynylation reaction.

Such ethynylation reaction products of the present invention as, for example, methylvinylethynyl carbinol, are useful as intermediates in the production of Vitamin A and Vitamin A-like products and other pharmaceuticals by procedures which are well known to the art. The ethynylation reaction products made in accordance with this invention are also of utility as brightening agents in electroplating baths for the electroplating of nickel, being used in the manner described, for instance in U.S. Pat. No. 2,712,522, being water-soluble acetylenic alcohols.

We claim:

1. In a method of preparing alcohols, the steps which comprise providing a suspension of (a) an alkali metal amide in (b) a liquid ether and containing (c) a stabilizing agent effective to activate the formation of a monoalkali metal acetylide, adding acetylene to said suspension to convert a portion of the alkali metal amide to a stabilized monoalkali metal acetylide, adding (d) a carbonyl compound to said stabilized monoalkali metal acetylide in admixture with unconverted alkali metal amide while continuing to add acetylene and thereafter hydrolyzing, said (a) ingredient being selected from the group of alkali metal amides and alkali metal diloweralkylamides; said (b) ingredient being selected from the group of dialkyl ethers, dialkyl ethers of alkylene glycols, tetrahydrofuran, tetrahydropyran, dioxane; 7-oxa (2,2,1)-bicycloheptane; liquid ethers represented by the formula

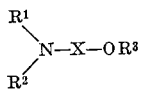

where $R^1$, $R^2$ and $R^3$ are the same or different alkyl each containing from 1 to 4 carbon atoms, and X is lower alkylene; said (c) ingredient being selected from the group of normally liquid sulfoxides having the formula

in which R is alkyl (including cycloalkyl) containing 1 to 12 carbon atoms or aryl or aralkyl hydrocarbons containing from 6 to 9 carbon atoms, or R and $R^1$ together form an alkylene group; amides represented by the formula

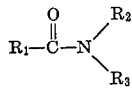

in which $R_1$ is hydrogen or alkyl (including cycloalkyl), and $R_2$ and $R_3$ are each alkyl (including cycloalkyl), aryl or aralkyl, the alkyl containing from 1 to 6 carbon atoms, and the aryl and aralkyl containing from 6 to 9 carbon atoms; hexamethylphosphoramide, hexaethylphosphoramide, 2-aminoethanol; 2-pyrrolidone; and 1-methyl-2-pyrrolidone; and said (d) ingredient being selected from the group of alkanones, alkenones, alkanals, alkenals, diacetyl, cyclopentanone, cyclohexanone, isophorone, benzophenone, methylbenzyl ketone; estrone; ethyl β-chlorovinyl ketone, furfural, benzaldehyde, β-naphthaldehyde and glyceraldehyde.

2. A method according to claim 1, in which the alkali metal is lithium.

3. A method according to claim 2, in which the stabilizing agent is of non-basic character.

4. A method according to claim 2, in which the stabilizing agent is dimethylacetamide.

5. A method according to claim 2 in which the stabilizing agent is a normally liquid sulfoxide having the formula

in which R is alkyl containing from 1 to 12 carbon atoms, R' is alkyl containing 1 to 12 carbon atoms or aryl or aralkyl hydrocarbon containing from 6 to 9 carbon atoms, or R and R' together form an alkylene group.

6. A method according to claim 5, in which the stabilizing agent is dimethylsulfoxide.

7. A method according to claim 2, in which the liquid ether is tetrahydrofuran.

8. A method according to claim 3, in which the liquid ether is tetrahydrofuran.

9. A method according to claim 2, in which the ketone is methylvinyl ketone.

10. A method according to claim 7, in which the aldehyde is an α,β-unsaturated aldehyde.

11. In a method of preparing alcohols, the steps which comprise providing a suspension of (a) lithium amide in (b) tetrahydrofuran and containing (c) a non-basic activating agent to activate the formation of monolithium acetylide, adding acetylene to said suspension to convert a portion of lithium amide to a stabilized lithium acetylide, then gradually adding (d) a carbonyl compound to said stabilized monolithium acetylide in admixture with unconverted lithium amide while continuing to add acetylene and thereafter hydrolyzing, said (c) ingredient being selected from the group of normally liquid sulfoxides having the formula

in which R is alkyl (including cycloalkyl) containing from 1 to 12 carbon atoms, $R^1$ is alkyl containing from 1 to 12 carbon atoms or aryl or aralkyl hydrocarbons containing from 6 to 9 carbon atoms, or R and $R^1$ together form an alkylene group; and amides represented by the formula

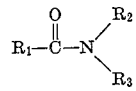

in which $R_1$ is hydrogen or alkyl (including cycloalkyl), and $R_2$ and $R_3$ are each alkyl (including cycloalkyl), aryl or aralkyl, the alkyl containing from 1 to 6 carbon atoms, and the aryl and aralkyl containing from 6 to 9 carbon atoms; hexamethylphosphoramide, hexaethylphosphoramide, 2-aminoethanol; 2-pyrrolidone; and 1-methyl-2-pyrrolidone; and said (d) ingredient being selected from the group of alkanones, alkenones, alkanals, alkenals, diacetyl, cyclopentanone, cyclohexanone, isophorone, benzophenone, methylbenzyl ketone; estrone; ethyl β-chlorovinyl ketone, furfural, benzaldehyde, β-naphthaldehyde and glyceraldehyde.

12. The method of claim 11, in which the (d) ingredient is methylvinyl ketone.

13. The method of claim 11, in which the (d) ingredient is acrolein.

14. The method of claim 13, in which the activating agent is dimethylacetamide.

15. The method of claim 14, in which the dimethylacetamide is present in an amount in the range of 0.1 to 1 equivalent per equivalent of lithium amide.

References Cited

UNITED STATES PATENTS

| | | | |
|---|---|---|---|
| 2,106,181 | 1/1938 | Kreimeier | 260—638Y |
| 2,777,884 | 1/1957 | Rutledge et al. | 260—638Y |
| 2,879,308 | 3/1959 | Pasedach et al. | 260—638Y |
| 2,919,281 | 12/1959 | Chodroff et al. | 260—638Y |
| 2,925,363 | 2/1960 | Bevley et al. | 260—638Y |
| 3,028,423 | 4/1962 | Blumenthal | 260—638Y |
| 3,470,217 | 9/1969 | Ginsig | 260—632 |

OTHER REFERENCES

Beumel et al., "J. Org. Chem.," vol. 29 (1964), pp. 1872 to 1876.

BERNARD HELFIN, Primary Examiner

J. E. EVANS, Assistant Examiner

U.S. Cl. X.R.

252—437, 438, 439; 260—326.8, 347.8, 397.5 551, 557, 561, 562, 584, 607, 617, 618, 631, 633, 635